United States Patent [19]

Baker

[11] 4,431,294

[45] Feb. 14, 1984

[54] ROTATION FAILURE SENSOR FOR FILM DISC PROCESSOR

[75] Inventor: Richard W. Baker, Anoka, Minn.

[73] Assignee: Pako Corporation, Minneapolis, Minn.

[21] Appl. No.: 432,816

[22] Filed: Oct. 5, 1982

[51] Int. Cl.[3] ........................... G03B 3/04; G03B 3/08

[52] U.S. Cl. .................................... 354/322; 354/330; 134/149; 366/274

[58] Field of Search ............... 354/312, 315, 316, 319, 354/320, 321, 322, 329, 330, 311; 134/57 R, 113, 149, 184; 366/273, 274; 310/103, 104, 105, 106

[56] References Cited

U.S. PATENT DOCUMENTS

| | | | |
|---|---|---|---|
| 3,116,913 | 1/1964 | Lane | 366/274 |
| 4,112,452 | 9/1978 | Patton | 354/322 |
| 4,112,453 | 9/1978 | Hutchinson | 354/330 |
| 4,112,454 | 9/1978 | Harvey | 354/330 |
| 4,167,320 | 9/1979 | Hutchinson | 354/323 |
| 4,178,091 | 12/1979 | Solomon | 354/322 |
| 4,188,106 | 2/1980 | Harvey | 354/330 |
| 4,194,822 | 3/1980 | Sethi | 354/121 |
| 4,252,430 | 2/1981 | Michal | 354/322 |
| 4,378,151 | 3/1983 | Muller et al. | 366/274 |

OTHER PUBLICATIONS

172 *Research Disclosure,* Aug. 1978: No. 17258–Horizontal In-Line Photofinishing Processor.

172 *Research Disclosure,* Aug. 1978: No. 17262–Method and Apparatus for Treating Elements of Photographic Film.

172 *Research of Disclosure,* Aug. 1978: No. 17263–Improved Horizontal Film-Processing Apparatus.

172 *Research Disclosure,* Aug. 1978: No. 17264–Improved Vertical Film-Processing Apparatus.

172 *Research Disclosure,* Aug. 1978: No. 17265–Rotary Film-Processing Apparatus.

174 *Research Disclosure,* Oct. 1978: No. 17429–Processor Concept.

Brochure–Eastman Kodak Company of Rochester, New York, "KODAK Disc Film Processor, Model 200".

Brochure–Eastman Kodak Company of Rochester, New York, "KODAK Disk Film Processor, Model 1000".

*Primary Examiner*—A. A. Mathews

*Attorney, Agent, or Firm*—Kinney, Lange, Braddock, Westman and Fairbairn

[57] ABSTRACT

A processor for processing undeveloped photographic film discs carried on a rotatable spindle includes a conveyor for conveying the spindle intermittently from a first end of the processor along a generally horizontal conveyor path to each of a plurality of stations along the conveyor path. The intermittent conveying of the spindle by the conveyor is cyclical, with each cycle of the conveyor having a transport portion during which the spindle is conveyed from one station to another and a processing portion during which the spindle is positioned at one of the stations for processing. The spindle and film discs mounted thereon are rotated when positioned for processing at each station, and a rotation sensor at each station senses a failure of the spindle to be rotated. The processor also has a spindle sensor which senses the presence of the spindle adjacent the first end of the processor. An indicator responsive to the spindle sensor, the conveyor and the rotation sensor identifies any station at which the spindle is located and at which the rotation sensor senses the failure of the spindle to be rotated.

12 Claims, 16 Drawing Figures

ROTATION FAILURE SENSOR FOR FILM DISC PROCESSOR

REFERENCE TO CO-PENDING APPLICATIONS

Reference is hereby made to the following co-pending patent applications filed on even date herewith entitled:

(1) "Magnetic Drive Mechanism For Film Disc Processor", Ser. No. 423,817 filed Oct. 5, 1982; and
(2) "Film Disc Processing Container", Ser. No. 423,818 filed Oct. 5, 1982.

BACKGROUND OF THE INVENTION

1. Field of the Invention

The present invention relates to automatic photoprocessing equipment for the processing of undeveloped photographic film. In particular, the invention relates to a spindle rotation failure sensor for a horizontal in-line film disc processor.

2. Description of the Prior Art

The processing of photographic film includes contacting the film with a plurality of processing fluids in a selected order and for selected time periods to properly develop the images thereon. Because the film is light-sensitive, the processing must be done in the dark. Once the film has been contacted with the fluids as desired, it is also necessary to dry the film before further processing can be performed, such as making prints or slides. Numerous machines have been devised for processing film in strip or web form. However, this type of apparatus is wholly unsuited for processing film in a disc film format where the individual photographic images are located circumferentially about a central hub, as shown, for example, in U.S. Pat. No. 4,194,822, granted to Sethi on Mar. 25, 1980. Thus, the introduction of cameras using film in a disc film format has led to the development of processing machines specifically for film discs.

Processing machines and devices developed specifically for disc film include those shown in the following U.S. patents:

| Patentee | U.S. Pat. No. | Issue Date |
|---|---|---|
| Michal | 4,252,430 | 02/24/81 |
| Harvey | 4,188,106 | 02/12/80 |
| Solomon | 4,178,091 | 12/11/79 |
| Hutchinson | 4,167,320 | 09/11/79 |
| Harvey | 4,112,454 | 09/05/78 |
| Hutchinson | 4,112,453 | 09/05/78 |
| Patton | 4,112,452 | 09/05/78 |

In addition to the devices shown in these patents, several disc film processing devices are shown in the following Research Disclosures:

| 172 Research Disclosure, August 1978 | |
|---|---|
| Disclosure No. | Title |
| 17258 | Horizontal In-Line Photofinishing Processor |
| 17262 | Method and Apparatus for Treating Elements of Photographic Film |
| 17263 | Improved Horizontal Film-Processing Apparatus |
| 17264 | Improved Vertical Film-Processing Apparatus |
| 17265 | Rotary Film-Processing Apparatus |

| 174 Research Disclosure, October 1978 | |
|---|---|
| Disclosure No. | Title |
| 17429 | Processor Concept |

Disc film processing machines are also shown in two brochures of the Eastman Kodak Company of Rochester, N.Y, entitled "KODAK Disc Film Processor, Model 200" and "KODAK Disc Film Processor, Model 1000."

Since the processing of photographic film must be carried out in the dark, a film disc processing machine must either be located in a darkroom or have some means for shielding the undeveloped film discs from light during processing to prevent damage to the photographic images on the film. As shown in many of the devices disclosed above, it is efficient to process a plurality of the film discs together by mounting them on a spindle, which is then carried through the processor from start to finish as a unit. The spindle unit is conveyed from tank to tank of processing fluid in sequence, with the spindle being rotated to uniformly coat the film discs thereon with processing fluid.

None of these prior art devices disclose an automatic processor for undeveloped photographic film discs which has a sensor to indicate when the spindle (carrying the film discs) at a certain processing station is not being properly rotated by the processor. Due to the fact that such processing operations must be carried out in the dark, an operator cannot easily view the processing operation to monitor its effectiveness. Therefore it becomes important to have a means to immediately indicate to the operator when a malfunction occurs during processing, such as when a spindle is not properly rotated at a processing station. In the case of a fluid processing station, the failure of the spindle to be rotated can seriously damage or destroy the photographic images carried on the film discs on that spindle, since (in the case of partial immersion of the film discs in processing fluid) some of the images on the film discs would be over-contacted with processing fluid while others would not be contacted at all. In order to process each and every film disc properly, the processing operation should take place without any interruption or interference, and if such problems occur, they must be rectified immediately.

SUMMARY OF THE INVENTION

The present invention comprises a processor for processing undeveloped photographic film discs mounted on a rotatable spindle. The processor includes conveyor means for conveying the spindle intermittently from a first end of the processor along a generally horizontal path to a plurality of stations. The intermittent conveying of the spindle by the conveyor means is cyclical, with each cycle of the conveyor means having a transport portion during which the spindle is conveyed from one station to another station and a processing portion during which the spindle is positioned at one of the stations for processing. Drive means are provided for causing the spindle and film discs mounted thereon to be rotated when the spindle is positioned at each station during the processing portion of the cycle. Spindle sensing means for sensing the presence of the spindle adjacent the first end of the processor is provided on the processor, along with means responsive to the spindle sensing means, the conveyor means, and the rotation sensing means for identifying any station at which a spindle is located and at which the rotation sensing means senses the failure of the spindle to be rotated by the drive means.

The processor of the present invention provides a rotation failure sensor for detecting the failure of a film disc-laden spindle to be rotated at a selected processing station during processing. The rotation failure sensor for each station is functionally connected to an indicator for each station which can immediately inform an operator at which station the spindle is not being rotated properly. Preferably, the indicator only identifies the station if the rotation failure sensor senses the failure of the spindle to be rotated after a predetermined time interval following commencement of the processing portion of each cycle.

DETAILED DESCRIPTION OF THE PREFERRED EMBODIMENTS

(1) General System Description

Figure 1:
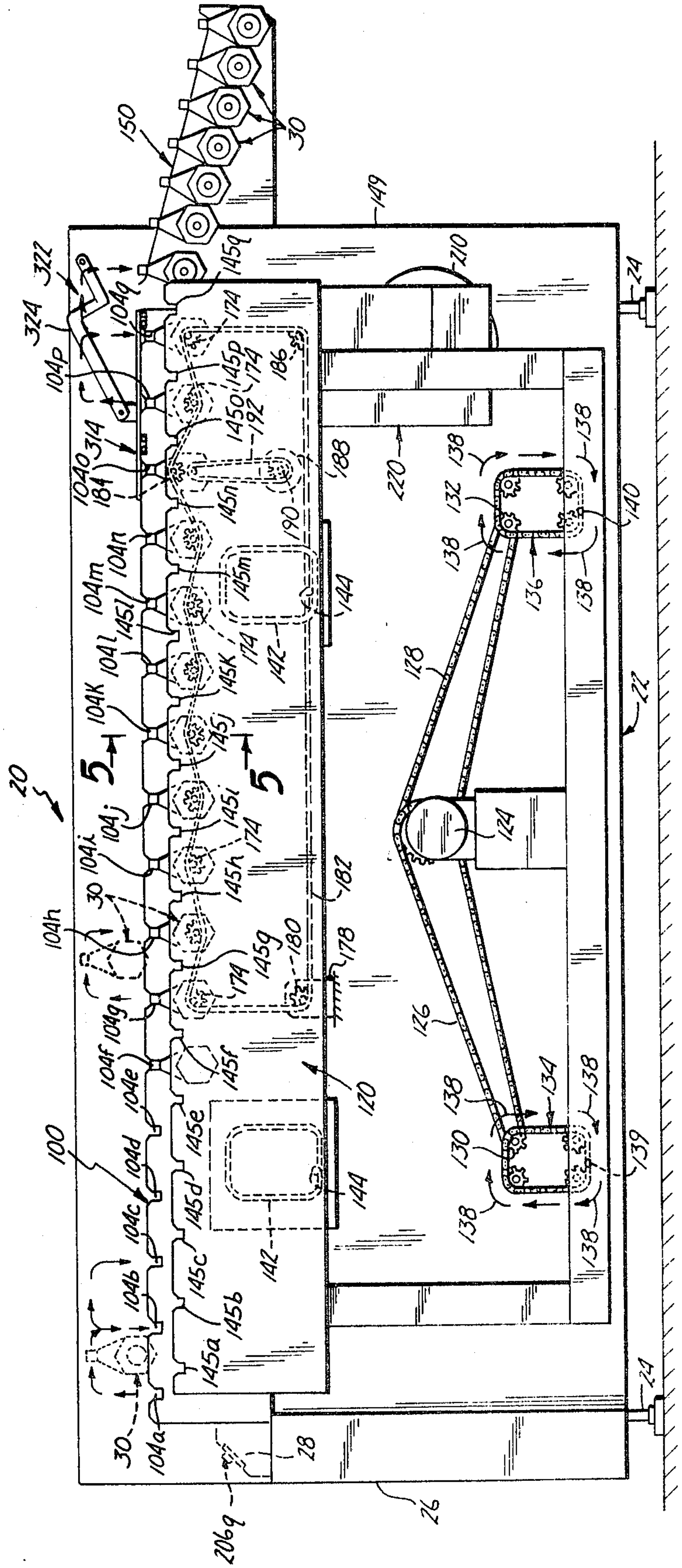
FIG. 1 (Sheet 1) is a side elevational view of the film disc processor of the present invention.

The film disc processor 20 of the present invention is shown generally in its entirety in FIG. 1 (Sheet 1). It has a main frame 22, which is supported by a plurality of support legs 24. Adjacent a first end 26 of the processor 20 is an operator's control panel 28, which houses the control means (not shown) for the processor 20.

(a) Film Disc Container 30

(FIGS. 2-4)

Figure 2:
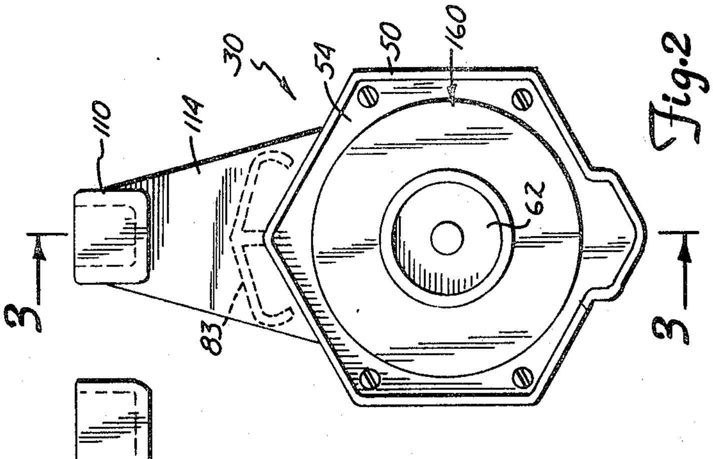
FIG. 2 (Sheet 2) is an end elevational view of the film disc container of the present invention.
Figure 3:
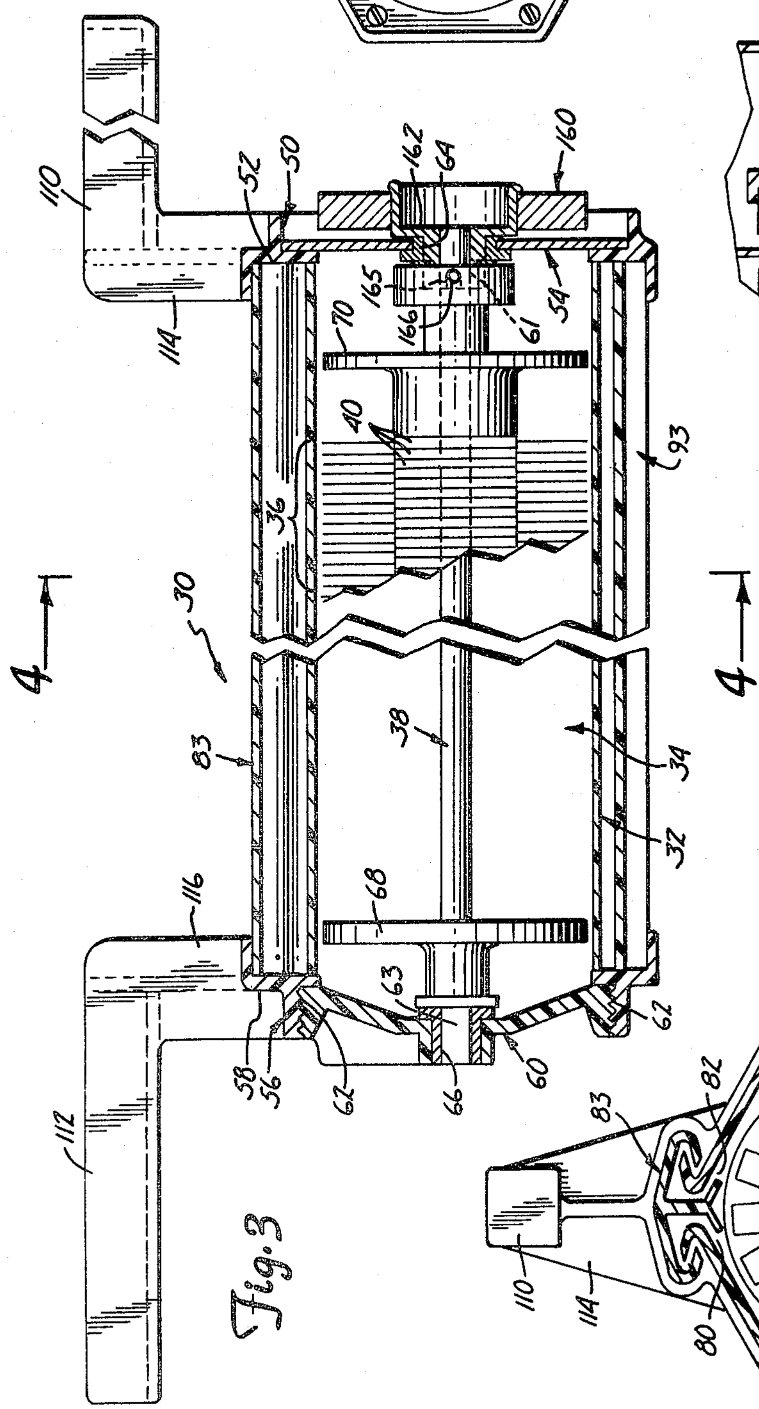
FIG. 3 (Sheet 2) is a sectional view taken along lines 3—3 in FIG. 2.
Figure 4:
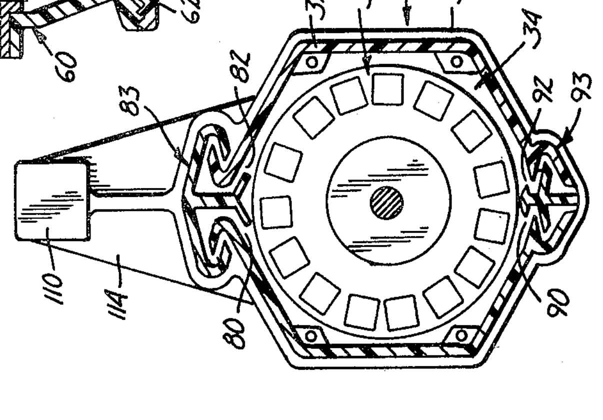
FIG. 4 (Sheet 2) is a sectional view taken along lines 4—4 in FIG. 3.

Undeveloped photographic film discs are carried through processing in the processor 20 in a film disc container 30. As best shown in FIGS. 2-4 (Sheet 2), the container 30 has an elongated housing 32 defining a main chamber 34 within the container 30. A plurality of film discs 36 are mounted coaxially upon a spindle 38 which extends longitudinally in the main chamber 34. As shown in FIG. 4, a hub 40 of each film disc 36 has a notch 42 adjacent its central hole 44, the notch 42 being aligned to engage a keyway 46 fixed longitudinally on the spindle 38 so that as the spindle 38 is rotated, the film disc 36 rotates with it. Although the film discs 36 are round, the container 30 is formed in a hexagonal shape (as viewed laterally as in FIG. 4) for handling ease. With such a shape, the container 30 does not roll away from an operator.

A first end member 50 is secured adjacent a first end 52 of the housing 32 and has an end wall 54 secured thereon as shown. A second end member 56 is secured adjacent a second end 58 of the housing 32 and has a removable end cap 60 selectively mounted thereon by suitable means, such as threads 62. The end cap 60 is removed to place the spindle 38 and film disc 36 thereon within the main chamber 34 of the container 30 for processing. The spindle 38 has first and second opposite end portions 61 and 63 defining a longitudinal axis of rotation, with the end portions 61 and 63 of the spindle 38 being rotatably mounted in the container 30 in bearing means 64 and 66 in the end wall 54 and end cap 60, respectively. Film disc holders 68 and 70 are securable about the spindle 38 to maintain the film discs 36 in axial alignment on the spindle 38, with the holder 68 being removable to allow the placement of film discs 36 on the spindle 38 and the holder 70 being slidable along the longitudinal axis of the spindle 38 to accommodate varying numbers of film discs 36 in the container 30.

The housing 32, first and second end members 50 and 56, end wall 54 and end cap 60 are all opaque, so that when the end cap 60 is secured over the second end 58 of the housing 32, no light from outside the container 30 enters the main chamber 34 through the second end 58 of the housing 32. Similarly, the end wall 54 prevents the admission of light into the main chamber 34 through the first end 52 of the housing 32. Each container 30 is a miniature and mobile darkroom for the film discs 36 contained therein. Because the container 30 is light-tight, the processor 20 can be located in a lighted room—it does not need to be located in the darkroom to prevent exposure of the images on the film discs being processed.

Of course, it would be impossible to process the film discs 36 in the main chamber 34 if the main chamber 34 was hermetically sealed. To properly process the film discs 36 and develop the photographic images thereon, the film discs 36 must be contacted by various processing fluids in a selected sequence. To this end, a plurality of longitudinal vents are provided on the housing 32 to permit processing fluids to enter the main chamber 34 and come in contact with the film discs 36. A left upper vent 80 and a right upper vent 82 (as viewed in FIG. 4) extend longitudinally along an upper longitudinal edge of the housing 32 and are covered by longitudinal opaque cover vent means 83 for preventing light from entering the main chamber 34 through the upper vents 80 and 82 but formed to permit fluid and/or gas to flow through the upper vents 80 and 82 into and out of the main chamber 34. Similarly, a left lower vent 90 and a right lower vent 92 (as viewed in FIG. 4) extend longitudinally adjacent a lower longitudinal edge of the housing 32, and have longitudinal opaque lower light baffle means 93 adjacent thereto for preventing light from outside the container 30 from entering the main chamber 34 through the lower vents 90 and 92, but formed to permit fluid and/or gas to flow through the lower vents 90 and 92 into and out of the main chamber 34.

When the container 30 is lowered into a tank of processing fluid, the fluid enters the main chamber 34 through the lower vents 90 and 92 as air exits the main chamber 34 through the upper vents 80 and 82. When the container 30 is lifted out of a tank of processing fluid, the opposite reaction occurs. Air enters the main chamber 34 through the upper vents 80 and 82 as fluid drains out of the main chamber 34 through the lower vents 90 and 92. In spite of this allowed fluid flow into and out of the main chamber 34, the vent cover means 83 and lower light baffle means 93 prevent light from entering the main chamber 34 through the upper and lower vents.

Figure 6:
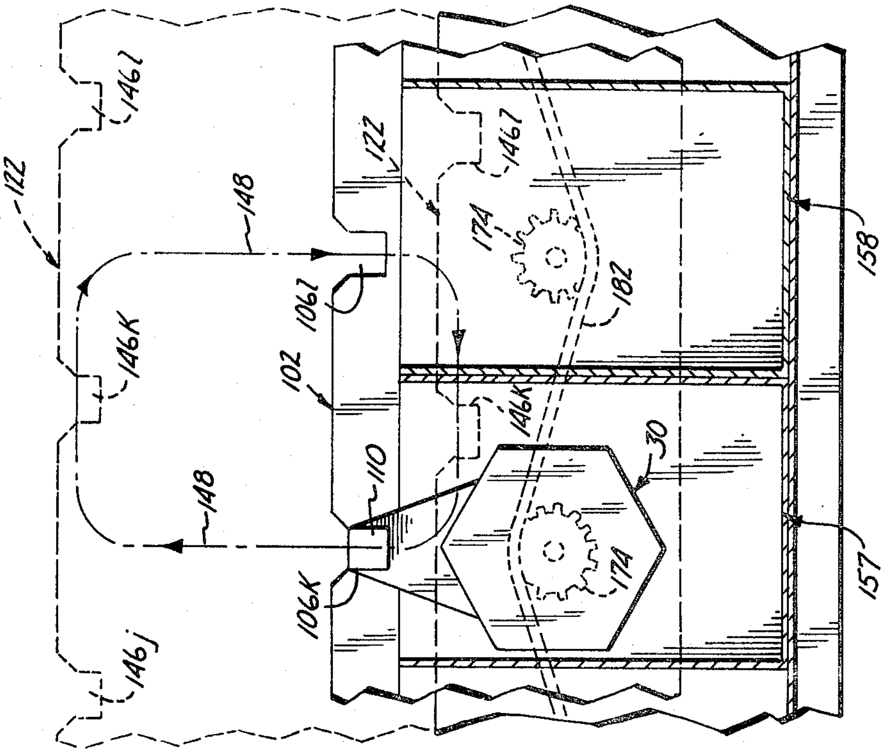
FIG. 6 (Sheet 3) is a sectional view taken along lines 6—6 in FIG. 6.
Figure 5:
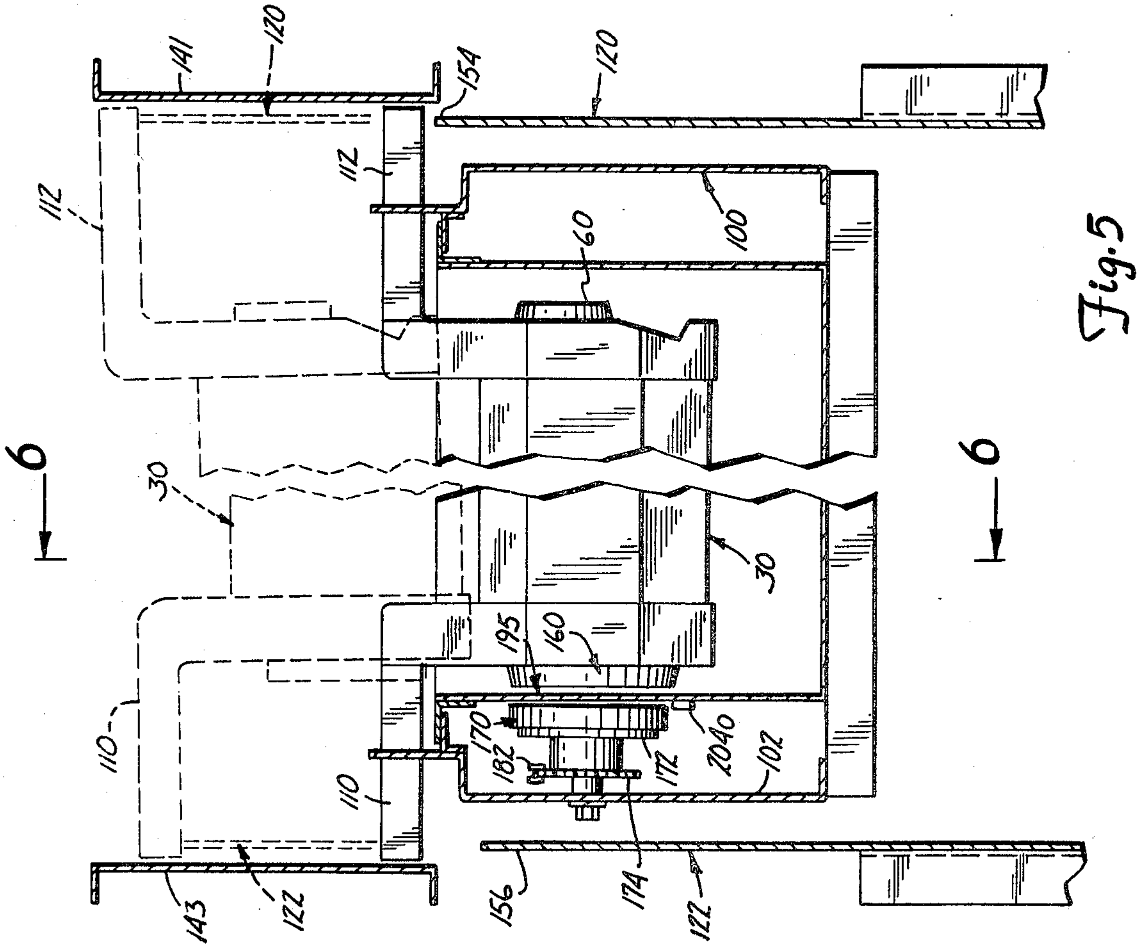
FIG. 5 (Sheet 3) is a sectional view taken along lines 5—5 in FIG. 1.

(b) The Conveyor Mechanism (FIGS. 1, 5 and 6)

The processor 20 of the present invention is essentially a horizontal in-line processor where the film discs 36 being processed are conveyed along a generally horizontal conveyor path to each of a plurality of stations for processing. The conveyor path of the processor 20 is generally defined by a pair of spaced generally horizonal stationary rails 100 and 102, with the position of each processing station along the conveyor path being defined by a laterally matched pair of station notches longitudinally spaced along the upper edges of the stationary rails 100 and 102. The relationship of the stationary rails (being parallel and spaced laterally across the conveyor path) is best shown in FIG. 5 (Sheet 3). The station notches along the upper edges of the stationary rails 100 and 102 are designated as station notches **104*a*–104*q* and 106*a*–106*q*, respectively. Since stationary rail 102 is not fully shown, however, only a portion of the station notches 106*a*–106*q* are shown for the stationary rail 102**, with those selected station notches being shown in FIGS. 6 and 7.

Each pair of station notches is designed to hold the container 30 in position for processing the film discs 36 therein at one of the processing stations along the conveyor path. To this end, the container 30 is provided with first and second hanger arms 110 and 112 adjacent the first and secoond ends 52 and 58, respectively, of the housing 32. The hanger arms 110 and 112 are colinear and extend generally parallel to the longitudinal axis of the spindle 38. As shown, the hanger arms 110 and 112 are spaced from the longitudinal axis of the spindle 38 by first and second hanger support legs 114 and 116 secured to the first and second end members 52 and 56, respectively, of the container 30. The cross sectional shape of the hanger arms 110 and 112 (as shown generally in FIGS. 2 and 4) corresponds to the shape of each of the station notches so that the container 30 is held in a relatively fixed position when the hanger arms 110 and 112 are placed in a laterally matched pair of station notches adjacent one of the processing stations.

A pair of spaced generally horizontally carriage rails 120 and 122 are movably mounted with respect to the stationary rails 100 and 102. The carriage rails 120 and 122 are parallel and spaced laterally across the conveyor path as best shown in FIG. 5. The carriage rails 120 and 122 are operably linked to move simultaneously through a closed movement path with respect to the stationary rails 100 and 102. Conveyor drive means for moving the carriage rails 120 and 122 is shown generally in FIG. 1.

A conveyor drive motor 124 is operably connected to first conveyor drive chains 126 and 128 which, in turn, are operably connected (through drive spindles 130 and 132, respectively) to second conveyor drive chains 134 and 136. Actuation of the conveyor drive motor 124 thus moves the second drive chains 134 and 136 simultaneously through closed identical generally rectangular paths as shown by arrows 138 in FIG. 1. Drive links 139 and 140 are separately secured to each second drive chain 134 and 136 to track the generally rectangular path of its respective drive chain. The drive links 139 and 140 are also secured to a lower portion of the carriage rail 120 so that the carriage rail also tracks a generally rectangular path as the conveyor drive motor 124 is actuated. To further guide the carriage rails in tracking the generally rectangular path, a pair of generally rectangular guide slots 142 are positioned adjacent an upper portion of the carriage rails. The guide slots 142 are generally coplanar with the second drive chains 134 and 136. Slidably mounted in each of the guide slots 142 is a follower link 144 which is secured to the carriage rail 120. As actuation of the conveyor drive motor 124 moves the drive links 139 and 140 through the generally rectangular path to move the carriage rails, the follower links 144 maintain the carriage rails in alignment as they also move through the path. Since the carriage rails 120 and 122 are fixedly secured laterally across the conveyor path, they move simultaneously through the generally rectangular path as defined by the guide slots 142. In addition, guide panels 141 and 143 are positioned along the conveyor path on the processor 20 adjacent the carriage rails 120 and 122, respectively, to maintain them in alignment during movement (see FIG. 5).

The carriage rails 120 and 122 have a plurality of laterally matched pairs of carriage notches longitudinally spaced along the upper edges thereof. The carriage notches along the upper edge of the carriage rails 120 and 122 are designated as carriage notches **145*a*–145*q* and 146*a*–146*q*, respectively. Since carriage rail 122 is not fully shown, only a portion of the carriage notches 146*a*–146*q* are shown for the carriage rail 122, with those selected carriage notches being shown in FIG. 6. When the carriage rails 120 and 122 are moved, the pairs of carriage notches also move through closed generally rectangular paths, as shown by path arrows 148 in FIG. 6. Each pair of carriage notches is designed to engage the container 30 (via hanger arms 110 and 112) as it conveyed by the carriage rails 120 and 122 from one pair of station notches to the next on the stationary rails 100 and 102**.

The stationary rails 100 and 102, carriage rails 120 and 122 and conveyor drive means define conveyor means for intermittently conveying the container 30 (and spindle 38 and film discs 36 therein) sequentially to each of the processing stations along the conveyor path (from the first end 26 to a second end 149 of the processor 20). The intermittent conveying of the container 30 by the conveyor means is cyclical, with each conveyor cycle having a processing portion (when the container 30 is held in position for processing of the film discs 36 therein by the station notches adjacent each station) and a transport portion (when the container 30 is conveyed from one station to the next along the conveyor path). For example, when processing is completed at a first station, the conveyor drive motor 124 is activated to cause the drive links 139 and 140 to make one circuit through the closed generally rectangular path, which in turn causes the carriage rails 120 and 122 to move simultaneously through their closed generally rectangular paths so that one pair of carriage notches thereon moves upwardly to engage the hanger arms 110 and 112 of the container 30 being held at that first station. The carriage rails 120 and 122 continue moving upwardly from that point to lift the container 30 off the station notches at the first station and then carry the container 30 generally horizontally along the conveyor path over a second station. The container 30 is then carried downwardly by the carriage rails 120 and 122 to deposit the container 30 on the station notches of the second station, with the carriage rails 120 and 122 continuing to move downwardly and horizontally to their previous position prior to activation of the conveyor drive motor 124, thereby completing the transport portion of one conveyor cycle.

This cyclical movement is best shown in FIGS. 5 and 6. The container 30 (and spindle 38 and film discs 36 therein) is in a lowered processing position at a selected station adjacent station notches 104*k* and 106*k* (notch 104*k* not shown in FIG. 6). The container 30 is advanced to a next or second station (adjacent station notches 104*i* and 106*l* (notch 104*l* not shown in FIG. 6) by the carriage rails 120 and 122 being moved through their closed generally rectangular paths which moves the carriage notches on the carriage rails through closed generally rectangular paths also. In particular, carriage notches 145*k* and 146*k* (notch 145*k* not shown in FIG. 6) move through the closed generally rectangular path as defined by arrows 148. During this movement, carriage notches 145*k* and 146*k* move upwardly to engage the hanger arms 110 and 112 of the container 30 positioned at the station notches 104*k* and 106*k*. Continuing on, carriage notches 145*k* and 146*k* move upwardly to carry the container 30 (and spindle 38 and film discs 36 therein) to a raised transfer position shown generally by the phantom container 30 in FIG. 5. While in this raised transfer position, the carriage rails convey the container 30 to position over the next station along the conveyor path. The carriage rails 120 and 122 then move downwardly to carry the container 30 (via carriage notches 145*k* and 146*k*) to the next station adjacent station notches 104*l* and 106*l*. The container 30 is deposited at the station notches 104*l* and 106*l* in a lowered processing position and the carriage notches 145*k* and 146*k* on the carriage rails 120 and 122 continue to move downwardly (and generally horizontally up the conveyor path) to a rails down position as shown in FIG. 6. The container 30 is thus conveyed along the conveyor path by the conveyor means so that the spindle therein has an axial direction which is generally horizontal and perpendicular to the conveyor path.

As stated, during processing it is necessary to contact the film discs 36 with processing fluids. For this purpose, some of the stations along the conveyor path of the processor 20 are fluid processing stations for contacting the film discs 36 with the various processing fluids in a selected sequence. Preferably, the fluid processing stations are adjacent the matched pairs of station notches 104*g*–106*g* through 104*n*–106*n* and comprise processing fluid tanks for separately containing the various processing fluids.

After the film discs 36 mounted on the spindle 32 in the container 30 have been contacted with the processing fluids in the selected order, it is necessary to remove any processing fluid left on the film discs 36. Preferably, this is done by blowing tempered air past the film discs 36 and spinning the spindle 38 at a high speed of rotation to cast or throw residual processing fluid from the film discs 36 by centrifugal force. To this end, some of the stations along the conveyor path are drying stations. In one preferred embodiment, three of the stations adjacent the second end 149 of the processor 20 are drying stations. A first drying station corresponds to the laterally matched pair of station notches 104*o* and 106*o* on the stationary rails 100 and 102. Second and third drying stations correspond in position to the laterally matched pairs of station notches 104*p* and 106*p* and 104*q* and 106*q*, respectively. (See FIGS. 1 and 7 (Sheet 4)).

In addition to having fluid processing and drying stations, some of the stations adjacent the first end 26 of the processor 20 are staging stations for staging or holding the containers 30 (and film discs 36 therein) prior to fluid processing. The staging stations are preferably adjacent the station notches 104*a*–106*a* through 104*f*–106*f*, as shown generally in FIG. 1. While the film discs 36 in the containers 30 positioned in the staging stations are not actually being "processed", they are conveyed by the conveyor means during each conveyor cycle along the conveyor path toward the fluid processing stations and drying stations. A complete processing cycle for the film discs 36 is obtained when film discs 36 are conveyed to each processing and drying station in sequence and are maintained for processing at each station for the time period defined by the processing portion of each conveyor cycle. When the processing cycle for a particular container 30 of film discs 36 is completed, the conveyor means deposits that container 30 on a developed film disc collection rack 150 adjacent the second end 149 of the processor 20, as shown in FIG. 1.

As shown in FIG. 5, a top portion 154 of the carriage rail 120 is higher than a top portion 156 of the carriage rail 122. In addition, the carriage notches of the carriage rail 120 are slightly higher than the carriage notches of the carriage rails 122 along the entire length of the conveyor path. The carriage rails 120 and 122 and their respective carriage notches are so aligned to facilitate draining of the container 30 when it is lifted out of the fluid processing tanks adjacent the fluid processing stations. This alignment is best shown in FIG. 5, where the container 30 (shown in phantom in its raised transfer position) is tilted slightly laterally across the conveyor path (to the left as in FIG. 5) to aid in fully draining processing fluid from the previous fluid processing tank during the transport portion of the conveyor cycle. Because the carriage notches on the carriage rail 120 are slightly higher, the container 30 is tilted along the axial direction of the spindle 32 therein during the entire time the container 30 is in transit between adjacent stations.

As shown in FIG. 6, closed generally rectangular paths traced by the carriage notches maintain the container 30 over a first fluid processing tank 157 from which the container 30 is being transferred for a majority of the time the container 30 is in transit. This complete (or nearly complete) draining of the processing fluid from the container 30 before the carriage rails 120 and 122 carry it over the second fluid processing tank 158 at the next processing tank along the conveyor path. This feature substantially reduced the carryover of processing fluid from one fluid processing tank to next, and therefore reduces the contamination and increases effectiveness of the processing fluids during processing.

(2) Magnetic Drive Mechanism (FIGS. 1, 5, 8, 9A, 9B and 14)

At the fluid processing and drying stations on the processor 20, it is advantageous to rotate the spindle 38 and film discs 36 thereon to fully contact the photographic images on the film discs 36 with the processing fluid at the fluid processing stations and fully dry the film discs 36 at the drying stations. Thus, spindle rotation means for rotating the spindle 38 and film discs 36 thereon during the processing portion of each conveyor cycle is provided at those stations.

A follower magnet 160 is rotatably mounted adjacent the first end 52 of the housing 32 of the container 30, as shown in FIGS. 2 and 3. Preferably, the follower magnet 160 is a disc magnet secured to a magnet hub 162 which is rotatably mounted in bearing means 64 as shown. An inner portion of the magnet hub 162 extends into the main chamber 34 and has a slot 165 therein. When the spindle 38 is properly positioned in the chambers 34, a pin 166 adjacent one end of the spindle 38 fits within the slot 165 to rotatably couple the spindle 38 with the follower magnet 160 through the magnet hub 162. The follower magnet 160 is, therefore, secured concentrically about an axis of rotation defined by the spindle 38. If the follower magnet 160 is caused to rotate, the spindle 38 and film discs 36 thereon will rotate with it.

Figure 8:
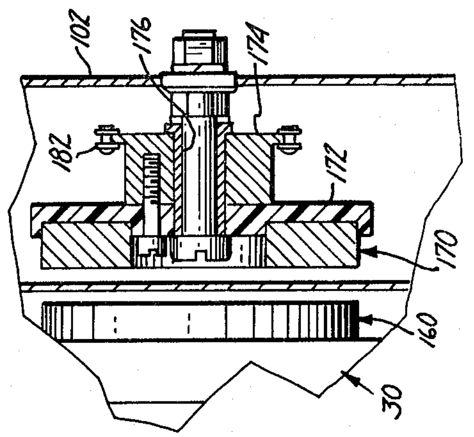
FIG. 8 (Sheet 2) is an enlarged fragmentary view of a portion of the drive and follower magnets of the magnetic drive means of the present invention with some parts shown in section.

A drive magnet 170 is rotatably mounted adjacent each of the fluid processing and drying stations in spaced axial alignment with the follower magnet 160 when the container 30 and spindle 38 therein is positioned for processing at one of those stations. As best shown in FIG. 8, the drive magnet 170 is also a disc magnet, and is secured to a drive magnet holder 172 which, in turn, is secured to a sprocket wheel 174. The drive magnet 170, holder 172 and sprocket wheel 174 are concentrically and rotatably mounted on a common axis about bearing means 176. The bearing means is secured to the stationary rail 102 by suitable means to fix the position of the drive magnet 170 relative to its adjacent station. The sprocket wheels 174 are shown in phantom in FIGS. 1 and 6.

The drive magnets 170 are rotatably driven by drive magnet rotation means, which includes a first drive motor 178 with motor drive sprocket 180 rotatably coupled thereto to engage a first endless magnet drive chain 182. The first magnet drive chain 182 engages the sprocket wheel 174 connected to each drive magnet adjacent the fluid processing and drying stations (except for the drive magnet 170 at the first drying station). The first drying station (adjacent station notches 104*o* and 106*o*) has a first dummy sprocket 184 (not connected to the drive magnet 170 at the first drying station) rotatably mounted adjacent thereto for engaging the first magnet drive chain 182. A second dummy sprocket 186 is rotatably mounted on the processor 20 to engage the first magnet drive chain 182 to provide tension thereto and maintain it in full engagement with the rest of its respective sprocket wheels. The path traced by the first magnet drive chain 182 is shown in FIG. 1. The drive magnet rotation means described aboved thus rotates the drive magnets 170 at all of the fluid processing stations and the second and third drying stations. As shown, the first magnet drive chain 182 passes over and under adjacent sprocket wheels 174 so as to turn them in opposite rotational directions. For example, the drive magnet 170 at the second drying station may rotate in a clockwise direction while the drive magnet 170 at the third drying station will rotate in a counterclockwise direction. Regardless of the direction, the drive magnets 170 which are operably connected to the first drive motor 178 will all rotate in an identical first rate of rotation.

When the hanger arms 110 and 112 are positioned in the station notches of one of the stations having a drive magnet 170 adjacent thereto, the follower magnet 160 and drive magnet 170 are in spaced axial alignment. Each of these magnets is magnetized to have the same number of alternative north and south poles radially spaced about one face thereof, and the magnets are spaced and axially aligned when the container 30 and spindle 38 are positioned at the station (as shown in FIG. 5) so that the magnetized faces of the follower magnet and drive magnet face one another.

Because each follower magnet 160 and drive magnet 170 are similar disc magnets with the same number of alternative north and south poles thereon, they will magnetically couple when placed adjacent one another. Because of this magnetic coupling, a rotation of one of the magnets about its axis causes rotation of the other magnet into an identical degree. The follower and drive magnets thus provide a synchronous magnetic torque coupler means for transmitting torque from the first drive motor 178 to the spindle 38 when the spindle 38 and its respective container 30 are positioned at one of those stations provided with a drive magnet 170 (except the first drying station).

The drive magnet 170 at the first drying station is caused to rotate by a different source—a second drive motor 188—which also comprises a portion of the drive magnet rotation means. The second drive motor 188 has a second drive sprocket 190 rotatably coupled thereto, as shown in FIG. 1. A second endless magnet drive chain 192 engages the second drive sprocket 190 and the sprocket wheel 174 on the drive magnet 170 adjacent the first drying station so that actuation of the second drive motor 188 rotates that sprocket wheel 174 and drive magnet 170 at a second higher rate of rotation. The second drive motor 188 is a variable speed motor which rotates the drive magnet 170 at the first drying station at both the first and second rates of rotation during the processing portion of each conveyor cycle. When a container 30 is positioned at the first drying station, the follower magnet 160 thereon and the drive magnet 170 of the first drying station provide a synchronous magnetic torque coupler means for transmitting torque from the second drive motor 188 to the spindle 38 in the container 30.

The drive magnet rotation means (which includes the first and second drive motors 178 and 188) thus rotates the drive magnets 170 to rotate the follower magnet 160 which, in turn, causes the spindle 38 and film discs 36 mounted thereon to be rotated. The magnetic coupling of the drive magnet 170 and the follower magnet 160 is achieved without mechanical connection, so that the spindle 38 and film discs 36 thereon can be rotated while in a fluid processing tank without the need for physically contacting the spindle 38 to make it rotate. Torque from the drive magnet 170 is transmitted across the gap to the follower magnet 160 so the magnets rotate virtually simultaneously. As shown in FIG. 5, the drive and follower magnets 170 and 160 do not touch, but are spaced apart by a gap which, in the case of a fluid processing station, includes a tank wall 195 of the fluid processing tank.

(3) Magnetic Coupling Failure Sensor

Figure 9A:
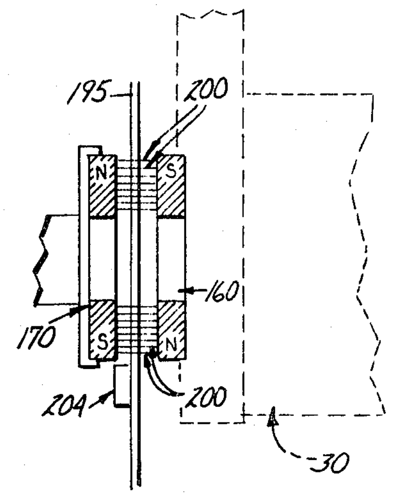
FIG. 9A (Sheet 5) is a partial side sectional view illustrating the magnetic coupling and flux lines adjacent the drive and follower magnets of the magnetic drive means of the present invention.
Figure 9B:
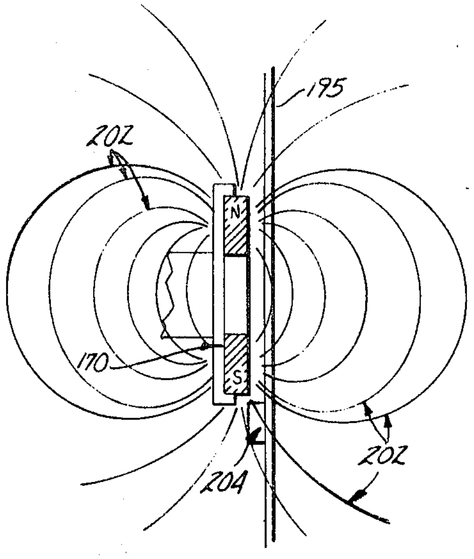
FIG. 9B (Sheet 5) is a partial side sectional view illustrating the magnetic flux lines adjacent the drive magnet of the magnetic drive means of the present invention when a follower magnet is not adjacent thereto or being properly rotated thereby.

(FIGS. 9A and 9B)

The processing of photographic film is a delicate and carefully controlled operation. The photographic images contained on the film are unique commodities, incapable of being reproduced if damaged or destroyed. It is therefore necessary to maintain the highest standards of quality control and equipment monitoring in film processing machines. To this end, the film disc processor 20 of the present invention is provided with rotation sensing means to detect whether the spindle 38 is being properly rotated when in position at the fluid processing and drying stations. Possible causes of a failure of proper spindle rotation are a binding of the spindle 38 in the container 30 thereby preventing it from rotating, or misalignment of the container 30 at one of the fluid processing or drying stations.

As shown in FIG. 9A, when the follower magnet 160 is properly aligned adjacent the drive magnet 170, magnetic flux lines (shown generally as flux lines 200) flow straight across the gap separating the two magnets. When the follower and drive magnets 160 and 170 are aligned for magnetically coupled rotation, the magnets are positioned so that opposite magnetic poles are directly across the gap from one another. For example, a north pole on the drive magnet 170 is positioned directly across from a south pole on the follower magnet 160, and vice versa (as shown in FIG. 9A). The magnetic flux lines between the facing faces of the magnets are thus straight across the gap.

When the follower magnet 160 is not in place adjacent the drive magnet 170, the magnetic flux lines adjacent the drive magnet 170 radiate outwardly from the drive magnet 170 generally as shown in FIG. 9B by flux lines 202. The flux lines arc outwardly from each pole of the drive magnet 170 generally in all directions. Capitalizing on the vast difference in flow patterns of the magnetic flux lines adjacent the drive magnet 170 for the two different situations (shown in FIGS. 9A and 9B) provides a means for sensing a failure of the follower magnet 160 to be rotated by the drive magnet 170.

A reed switch 204 is secured adjacent the follower magnet 170, such as on the tank wall 195 of a fluid processing tank. As is conventional, the reed switch 204 has a pair of reeds spaced apart therein which, when exposed to a magnetic field, are attracted together. When the follower magnet 160 and the drive magnet 170 are properly coupled (as in FIG. 9A), no magnetic flux lines pass through the reed switch 204. However, when there is no coupling between the drive magnet 170 and the follower magnet 160, the magnetic flux lines 202 (in FIG. 9B) pass through the reed switch 204 thereby magnetizing the reeds therein and attracting them into contact with on another. The reeds are conductors of electricity and can serve as contacts for opening and closing the magnetic reed switch 204 to provide a signal as to whether magnetic flux lines are passing through the reed switch 204. The reed switch 204 thus senses whether or not a desired magnetic flux is achieved between the drive magnet 170 and follower magnet 160.

Figure 10:
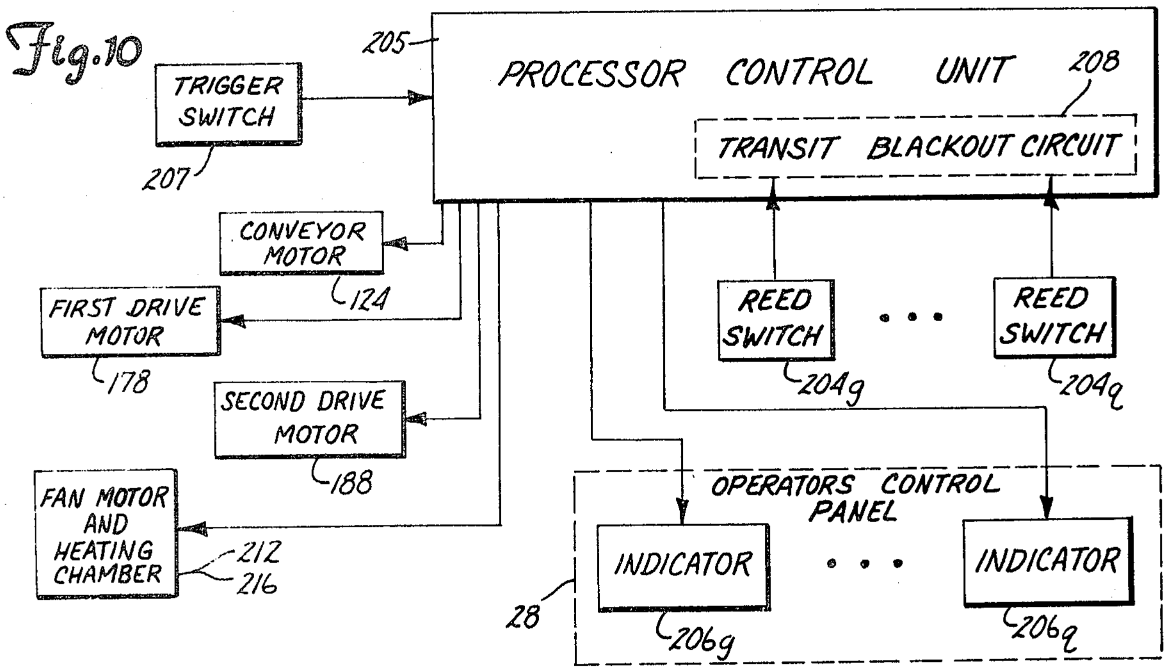
FIG. 10 (Sheet 6) is a block diagram of the control apparatus of the processor of the present invention.

The conveyor means conveys the container 30 along the conveyor path from a first end 26 to a second end 149 of the processor 20. At selected stations on the conveyor path (preferably, the fluid processing and drying stations), drive magnets 170 are provided to rotate the film discs 36 in the container 30 when it is in position for processing at each one of those stations. Each of those stations is also provided with a reed switch 204 (generally indicated in FIG. 10 as reed switches 204*g*–204*q*). Therefore, each station having a drive magnet 170 is provided with rotation sensing means for sensing a failure of the follower magnet 160 to be rotated by the drive magnet 170.

Signals from the reed switches 204*g*–204*q* are monitored by a processor control unit 205. The processor control unit 205, which preferably includes a microprocessor, monitors and activates the various functional components of the processor 20 including the conveyor drive motor 124, first drive motor 178, second drive motor 188, fan motor 212 and heating chamber 216.

A plurality of indicators 206*g*–206*q*, such as light emitting diodes, are visibly mounted on the operator's control panel 28. Each indicator 206*g*–*q* corresponds to one of the reed switches 204*g*–*q* on the processor 20.

A processor cycle trigger switch 207 is positioned adjacent one of the staging stations adjacent the first end 26 of the processor 20, and preferably adjacent the staging station next to the first fluid processing station defined by station notches 104*g* and 106*q*. The processor cycle trigger switch 207 is activated by the presence of the container 30 (and the spindle 38 and film discs 36 therein) at that staging station. The processor control unit 205 receives a "spindle present" signal from the trigger switch 207, and dependent upon that signal, the processor control unit 205 initiates a complete processing cycle for the film discs 36 in the container 30. Because the conveyor means conveys the container 30 in sequence through the remaining stations of the processor, the processor control unit 205 (through conveyor cycle counting means and memory means, not shown) always knows the station at which the container 30 is positioned for processing. Thus, if there is a failure of magnetic coupling at a selected station, such as the fluid processing station positionally defined by station notches 104*k* and 106*k*, reed switch 204*k* detects the failure of magnetic coupling and signals the processor control unit 205 accordingly. The processor control unit, in turn, activates the appropriate indicator, which in this case is indicator 206*k*, to alert the operator of the rotation failure. In addition, an audible alarm (not shown) is also triggered to alert the operator of the magnetic coupling failure when any one or more of the indicators is activated. The processor control unit 205 performs this alarm function dependent upon the trigger switch 207, reed switches 204*g*–*q* and the conveyor means.

Of course, when the container 30 (and follower magnet 170 mounted thereon) is in transit between one station and another, the reed switch 204 will be activated by the magnetic flux lines of the drive magnetic 170 (the situation indicated in FIG. 9B). To prevent all of the indicators 206*g*–*q* from being activated during the transport portion of the conveyor cycle, a transit blackout circuit 208. The transit blackout circuit 208, as a function of the transport portion of the conveyor cycle, prevents the magnetic coupling failure signals from the reed switches 204*g–q* from activating the indicators 206*g–q* via the processor control unit 205 during the transport portion of each conveyor cycle.

Once the transport portion of the conveyor cycle is completed and the processing portion of the cycle is commenced, the transit blackout circuit 208 allows the reed switches 204*g–q* to signal the processor control unit 205 of a rotation failure at their respective stations. Preferably, for a predetermined time interval following commencement of the processing portion of each conveyor cycle, the transit blackout circuit 208 prevents signals from the reed switches 204*g–q* from activating the indicators 206*g–q* via the processor control unit 205. This allows the follower magnet 160 to become properly aligned and rotating to speed with the drive magnet 170. Once the predetermined time interval has passed, the transit blackout circuit 208 allows the signals from the reed switches 204*g–q* to reach the processor control unit 205 so that if a particular follower magnet 170 is not properly magnetically coupled to its respective drive magnet 160, the proper indicator 206*g–q* will be activated by the processor control unit 205.

Because the film discs 36 are encased in the container 30 and cannot be viewed by the operator during processing, it is imperative that the operator be alerted to any situation which could lead to damage or improper processing of the film discs 30. The system described above to sense and indicate when there is a failure of magnetic coupling at a certain station on the processor 20 immediately indicates to the operator if a follower magnet 170 and spindle 38 are not rotating properly at a certain processing station. Thus, to prevent damage to the film discs 36, the operator can immediately react to this malfunction (knowing which container 30 it relates to because of the indicators 206*g–q*) and rectify the situation before the unique photographic images on the film discs 36 are damaged or destroyed.

(4) Film Disc Drying

(FIGS. 7 and 11–13)

Figure 7:
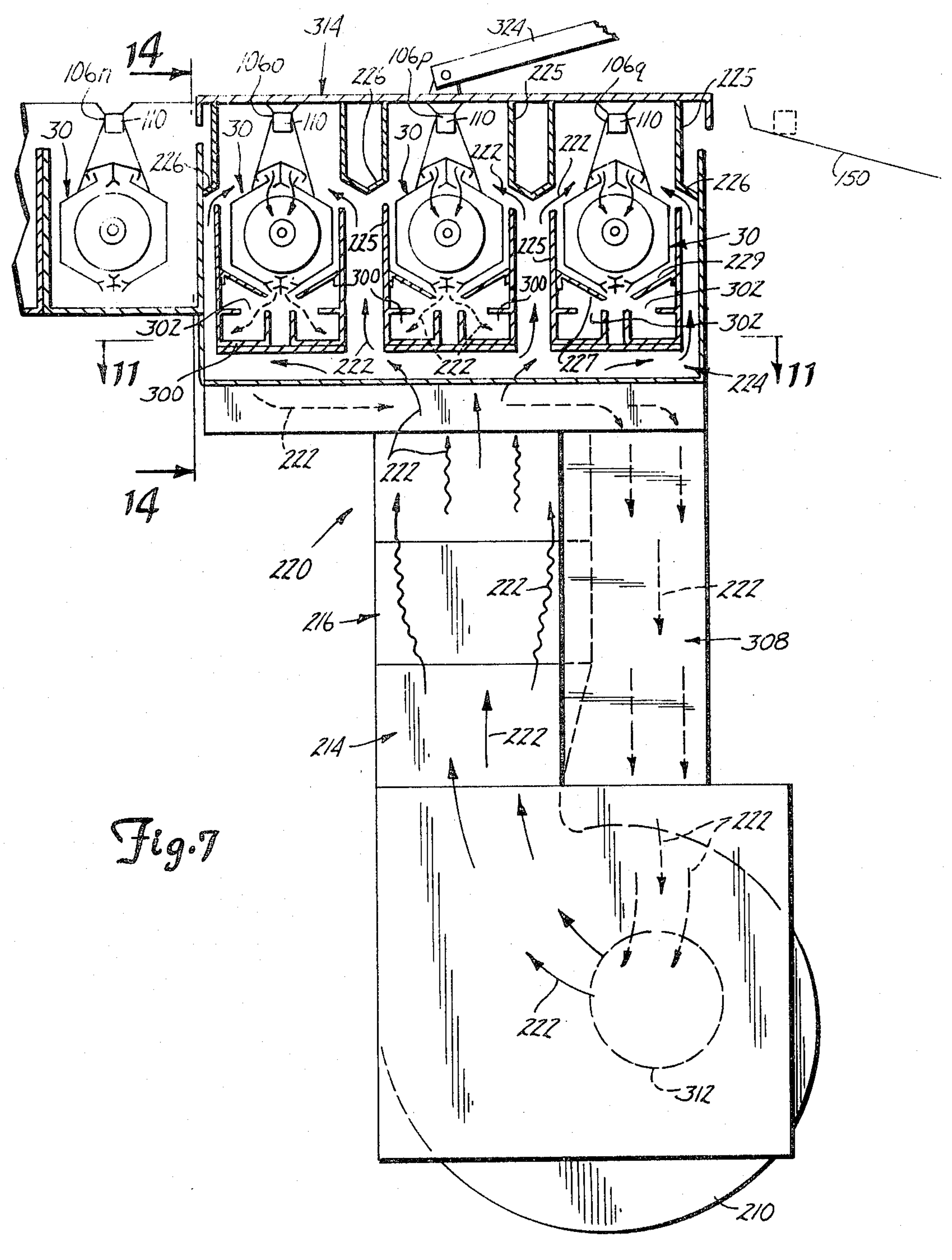
FIG. 7 (Sheet 4) is an enlarged lateral sectional view of the film disc drying portion of the processor.
Figure 11:
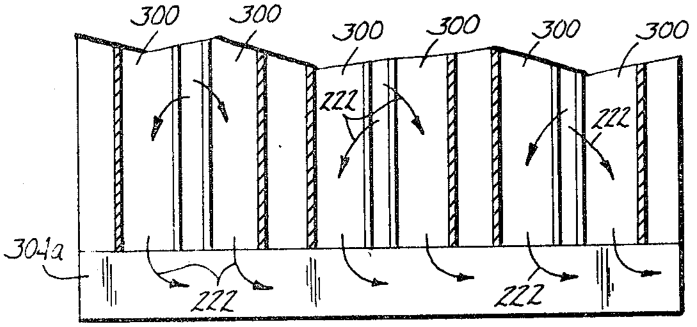
FIG. 11 (Sheet 4) is a sectional view taken along lines 11—11 in FIG. 7.
Figure 12:
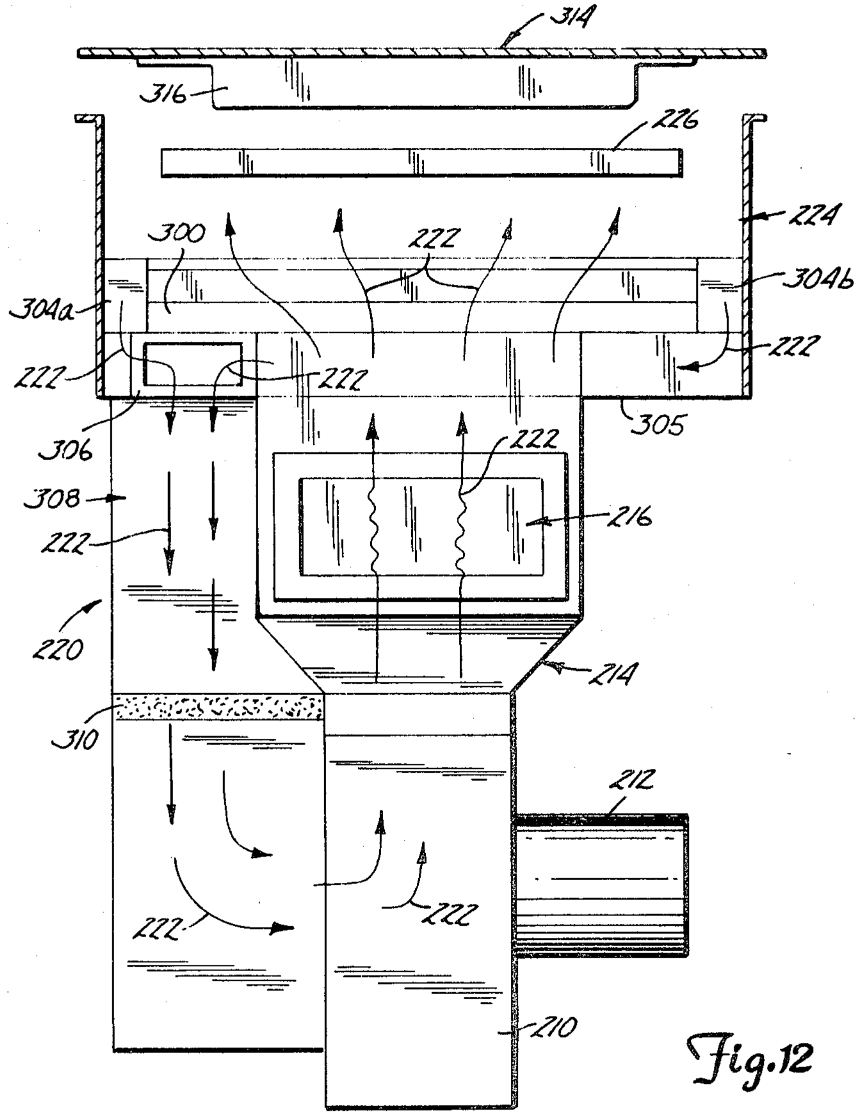
FIG. 12 (Sheet 5) is an end elevational view of the film disc drying portion of the processor with some parts removed or shown in section.

To evenly and properly dry the film discs 36 at the drying stations, tempered air is blown and drawn past the film discs 36 in the containers 30. To achieve a uniform air flow through the containers 30, a sophisticated duct and vent system is necessary, as shown in FIGS. 7, 11 and 12. A fan 210 driven by a fan motor 212 blows air upwardly through an upward duct 214 through an air heating chamber 216 which has heating means therein for tempering the air. The upward duct 214 is a portion of a duct system 220 which carries the air through a closed air circulation path from the fan 210 past the drying stations. The air flow through the duct system 220 is shown by air flow arrows 222 in FIGS. 7, 11 and 12.

Upon exiting an upper end of the upward duct 214, the tempered air disperses outwardly in a duct chamber 224 to each of the three drying stations. The tempered air is diverted in the duct chamber 224 to flow upwardly adjacent lateral divider walls 225 adjacent the lateral sides of the containers 30 positioned at the drying stations (as viewed in FIG. 7). The tempered air is then directed into the main chamber 34 of each container 30 by a plurality of deflectors 226 mounted on the divider walls 225 as shown. The deflectors 226 are elongated and extend laterally across the entire conveyor path, as shown in FIG. 11 (in terms of the containers 30, the deflectors extend the entire longitudinal length of the container 30) to direct the tempered air through an opening 223 in the divider wall 225 toward the container 30 (as shown by the flow arrows 222). From the deflectors 226, the divider walls 225 extend upwardly to limit excessive turbulence and a resultant waste of tempered air.

Figure 13:
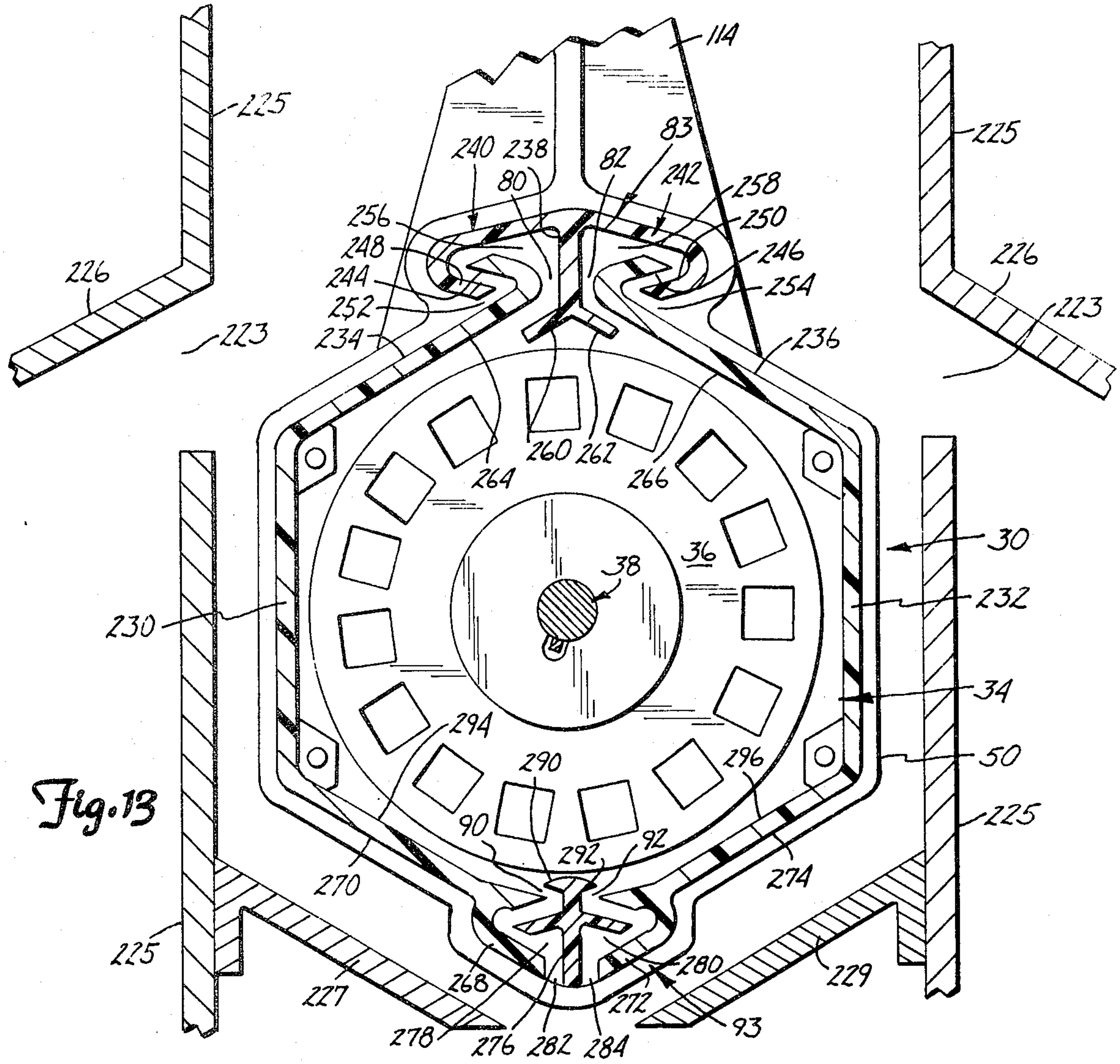
FIG. 13 (Sheet 6) is a sectional view of a portion of one of the drying stations of the processor of the present invention with a container positioned therein.

The deflectors 226 are aligned to divert the tempered air blown from the fan 210 under each lateral side of the vent cover means 83 on the container 30 positioned at each drying station. As best shown in FIG. 13 (Sheet 6), the housing 32 of the container 30 comprises left and right longitudinal housing sections 230 and 232. At an upper longitudinal edge of the housing 32 the left and right housing sections 230 and 232 are not joined together so as to define a first longitudinal aperture adjacent the upper longitudinal edge of the housing 32. Similarly, at a lower longitudinal edge of the housing 32, the left and right housing sections 230 and 232 are not joined together so as to define a second lower longitudinal aperture in the housing 32 adjacent the lower longitudinal edge thereof.

The longitudinal opaque vent cover means 83 is secured over the first upper aperture and adjacent left and right upper exterior surfaces 234 and 236 of the left and right housing sections 230 and 232, respectively. The vent cover means 83 has a longitudinal divider wall 238 extending from an underside thereof through the first upper aperture to divide the first upper aperture into the left and right upper longitudinal vents 80 and 82 as shown. The vent cover means 83 also has left and right wing poritons 240 and 242 which extend laterally from the divider wall 238 over the left and right upper vents 80 and 82, respectively.

Upper longitudinal edges of the left and right housing sections 230 and 232 are shaped to form upwardly extending left and right longitudinal lips 244 and 246, respectively. Outer longitudinal edges of the left and right wing portions 240 and 242 are shaped to form downwardly extending longitudinal left and right lip portions 248 and 250 which are spaced from the external surfaces 234 and 236 and upwardly lip portions 244 and 246 on the left and right housing sections 230 and 232, respectively. These spaces define left and right longitudinal gaps 252 and 254.

The divider wall 238, wing portions 240 and 242, and exterior surfaces 234 and 236 of the housing are positioned to define separate left and right vent chambers 256 and 258 therebetween. Left upper vent 80 communicates with the left gap 234 through the left vent chamber 256 and the right upper vent 82 with the right gap 254 communicates through the right vent chamber 258. Adjacent a lower end of the divider wall 238 are a pair of longitudinal left and right stub wings 260 and 262 extending generally parallel to left and right upper inner surfaces 264 and 266 of the left and right housing sections 230 and 232.

The housing 32 and vent cover means 83 as described thus provide means to prevent light from entering the main chamber 34 via the first upper aperture, but permit fluid to flow through the first upper aperture for fluid processing or air to flow through the first upper aperture for film disc drying.

The longitudinal opaque lower light baffle means 93 is secured adjacent the second lower aperture and has a left longitudinal cover portion 268 secured on a left lower external surface 270 of the left housing section 230 and a right longitudinal cover portion 272 secured on a right lower external surface 274 of the right housing section 232. The left and right cover portions 268 and 272, along with left and right longitudinal lower edge portions 269 and 271 of the left and right housing sections 230 and 232, respectively, define a longitudinal auxiliary chamber 275 adjacent the lower longitudinal edge of the housing 32.

The lower light baffle means 93 has a central longitudinal wall 276 which extends through the auxiliary chamber to divide the auxiliary chamber into left and right longitudinal auxiliary vent chambers 278 and 280, as shown in FIG. 13. The central longitudinal wall 276 also divides the second lower aperture into the left and right lower longitudinal vents 90 and 92 and extends between longitudinal edges of the left and the right cover portions 268 and 272 to define left and right longitudinal slots 282 and 284 therebetween. As shown, the left lower vent 90 communicates with the left slot 282 through the left auxiliary vent chamber 278 and the right lower vent 92 communicates with the right slot 284 through the right auxiliary vent chamber 280. The central longitudinal wall 276 is provided with first left and right longitudinal vanes 286 and 288 which extend into the left and right auxiliary vent chambers 278 and 280, respectively. Adjacent an upper end of the central longitudinal wall 276 are second left and right longitudinal vanes 290 and 292 which are spaced from left and right lower longitudinal edge portions 269 and 271 of the left and right housing sections 230 and 232.

The lower light baffle means 93 and housing 32 are formed as described to provide means to prevent light from entering the main chamber 34 via the second lower aperture but permit fluid to flow through the aperture. With the container 30 as described and shown in FIG. 13, the film discs 36 therein can be uniformly coated with processing fluid from the fluid processing tanks along the conveyor path. For fluid processing, the container 30 is moved by the conveyor means to the lowered processing position so that processing fluid from the fluid processing tank enters the main chamber 34 through the second lower aperture (via left and right longitudinal slots 282 and 284) to contact the film discs 36 within the main chamber 34. As the processing fluid enters the main chamber 34 through the second lower aperture (via left and right lower vents 90 and 92), air escapes the main chamber through the first upper aperture (via left and right upper vents 80 and 82). In this position, the magnetic drive mechanism causes the film discs 36 to be rotated in the container 30 to insure uniform contact of the photographic images on the film discs 36 with the processing fluid. Because of this rotation, the container 30 need not be totally immersed in the processing fluid, but can be only partially immersed (preferably at least up to the spindle 38) for proper fluid processing of the film discs 36.

When the processing portion of the conveyor cycle is completed, the container 30 is moved by the conveyor means to the raised transfer position and the processing fluid drains from the main chamber 34 through the second lower aperture (via left and right slots 282 and 284). When so raised the processing fluid in the main chamber 34 drains through the second lower aperture (via left and right lower vents 90 and 92) as air is drawn into the main chamber 34 through the first upper aperture (via the left and right upper aperture vents 80 and 82).

The cover vent means 83 not only permits fluid to flow from outside the container 30 into the main chamber, but also acts as an airflow direction guiding means to facilitate the entry of tempered air from the fan 210 into the main chamber 34. The deflectors 226 direct the flow of tempered air in the duct chamber 224 toward the upper exterior surfaces 234 and 236 of the housing 32 and under the left and right wing portions 240 and 242 of the vent cover means 83, respectively. As shown in FIG. 7, the air flows into the main chamber 34 through the first upper aperture and out of the main chamber 34 through the second lower aperture. The vent cover means 83 thus defines a flow path for the flow of the tempered air along each lateral side of the container 30 under the vent cover means 83 and into the main chamber 34 to facilitate drying of the processed photographic film discs 36 therein.

To further aid in drawing the tempered air through the main chamber 34 of the container 30, a reduced pressure is created outside of the container 30 adjacent the second lower longitudinal aperture to draw the air out of the main chamber 34 through the left and right lower vents 90 and 92. This is done by positioning a plurality of first longitudinal return ducts 300 under the container 30 when it is in its lowered processing position at the three drying stations. Each of the first return ducts 300 each has an air intake opening 302 through which the air is drawn (by the reduced pressure) through the second lower aperture from the main chamber 34. Efficient air flow into the return ducts 300 is aided at each drying station by left and right lower deflectors 227 and 229 which are closely spaced from the left and right lower external surfaces 270 and 274 on the housing 32, respectively. The left and right lower lower deflectors 225 and 227 (which extend the entire longitudinal length of the container 30) are positioned as shown to limit turbulence and loss of a reduced pressure state adjacent the second lower aperture.

From the first return ducts 300, the air is drawn to a pair of second lateral return ducts **304*a* and 304*b* extending generally parallel to the conveyor path on opposite sides of the duct chamber 224, as best shown in FIG. 11. The air is drawn through the second return duct 304*b* into a third return duct 305 extending laterally across the conveyor path as shown in FIG. 12. Air from the other second return duct 304*a* and air from the third return duct 305 is drawn into a fourth return duct 306 which extends generally parallel to the conveyor path and leads to a downward duct 308. The air is drawn through the downward duct 308 through filter means 310 (for removing impurities from the air) into an intake opening 312 of the fan 210 for recirculation. This three dimensional duct work and venting system thus uniformly directs tempered air past the film discs 36 in the drying stations without the need for removing the film discs 36 from the containers 30. The film discs 36 are thus completely dried at the end of their processing cycle when the container 30 is deposited on the developed film disc collection rack 150**.

(5) The Dryer Hood

(FIGS. 1, 7, 12, 14 and 15)

Figure 15:
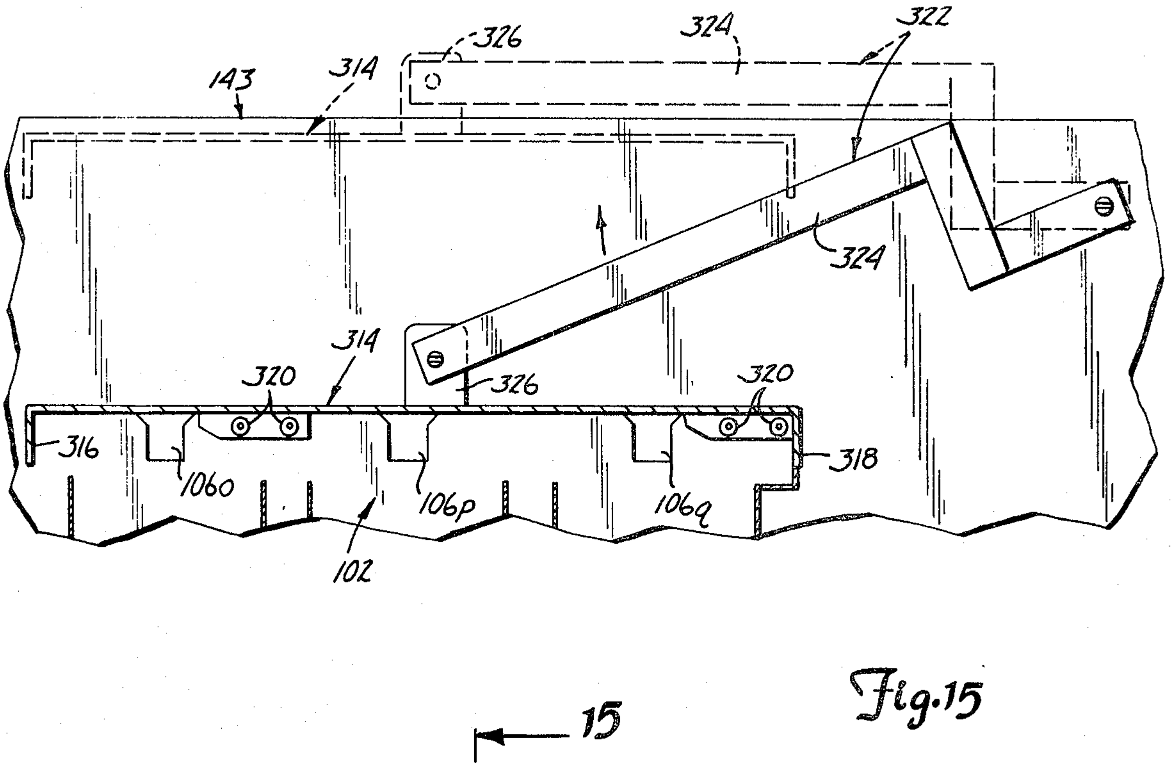
FIG. 15 (Sheet 7) is a sectional view as taken generally along lines 15—15 in FIG. 14.
Figure 14:
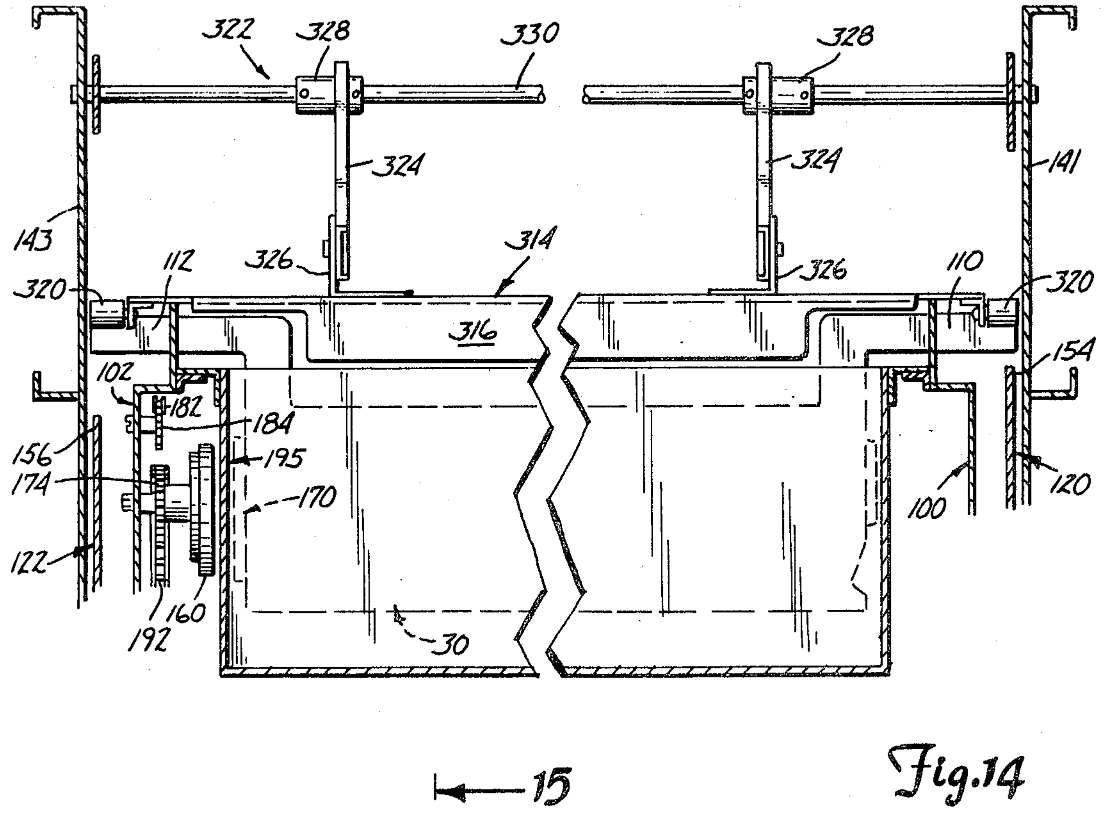
FIG. 14 (Sheet 7) is a sectional view as taken generally along lines 14—14 in FIG. 7.

A dryer hood 314 encloses the drying stations when in a first lowered operational position (as shown in FIGS. 1, 7 and 14 (Sheet 7)) to additionally direct the tempered air from the fan 210 through the drying stations and containers 30 therein. The dryer hood has first and second end wall portions 316 and 318 extending generally vertically and laterally relative to the conveyor path, as best shown in FIG. 15 (Sheet 7). The first and second end wall portions 316 and 318 are notched at their sides as shown in FIG. 14 to permit the hanger arms 110 and 112 of the container 30 to pass into and out of the drying stations without interference from the dryer hood 314.

The dryer hood 314 is movable between its first lowered operational position and a second raised position (shown in phantom in FIG. 15) to permit the advancement of the container 30 into and out of the drying stations. Movement of the dryer hood 314 is intermittent being synchronized with the movement of the carriage rails 120 and 122 so that the dryer hood 314 is moved to its second raised position when the container 30 is moved from one station to the next along the conveyor path by the carriage rails. The dryer hood is then moved to its first lowered operational position when the container 30 is positioned at the next station by the carriage rails. These movements are coordinated because the dryer hood 314 is actually raised by the movements of the carriage rails 120 and 122. A plurality of slide bearings, such as rollers 320 are rotatably secured adjacent the sides of the dryer hood 314 and positioned over the upper end portions 154 and 156 of the carriage rails 120 and 122, as shown in FIG. 14.

Each cycle of the conveyor means moves the carriage rails 120 and 122 through their closed generally rectangular paths and simultaneously raises the upper end portions 154 and 156 thereof into engagement with the rollers 320 on the dryer hood 314. When the carriage rails 120 and 122 have moved to their highest position, the dryer hood 314 is carried to the position shown in phantom in FIG. 15. Upon moving through the rest of their closed generally rectangular paths, the carriage rails 120 and 122 again lower the dryer hood 314 into its lowered operational position.

As the carriage rails 120 and 122 move through their closed generally rectangular paths, they move back and forth longitudinally relative to the conveyor path. Thus, the rollers 320 permit the dryer hood 314 to remain generally in position over the drying stations as the carriage rails move longitudinally. To prevent the longitudinal movement of the carriage rails 120 and 122 from moving the dryer hood 314 from its position on the conveyor path adjacent its drying stations, the dryer hood 314 is pivotally secured to the processor 20 by a tether link assembly 322. As shown, the tether link assembly 322 includes a pair of pivot arms 324, each of which is separately pivotally mounted to an ear 326 mounted on the dryer hood 314. At their other ends, the pivot arms 324 are secured to collars 328 which are concentrically and rotatably mounted about a rod 330. The rod 330 extends laterally across the conveyor path and its ends are mounted in the guide panels 141 and 143. The tether link assembly 322 thus connects the dryer hood 314 to the processor 20 and allows generally vertical movement of the dryer hood 314 while limiting its movement longitudinally with respect to the conveyor path. This dryer hood arrangement is suitable for use on other horizontal in-line film disc processors, such as the processor disclosed in a related patent application entitled "Dryer Apparatus for Film Disc Processor" Ser. No. 432,819 filed Oct. 5, 1982. That application, which is hereby incorporated by reference, is assigned to the same assignee as the present one.

(6) Conclusion

The present invention provides a processor for automatically processing photographic film discs mounted on a spindle. The processor contacts the film discs with processing fluid in the preselected sequence and then dries the film discs, with the film discs being rotated through a magnetic drive mechanism to facilitate uniform fluid contacting and uniform drying. A rotation failure sensor is provided which alerts an operator that rotation is not taking place at a certain station along a conveyor path. The spindle is carried in a light-tight container which has a plurality of apertures to permit the flow of fluid into and out of the container. Light is prevented from entering the container through the apertures by cover and baffle means which also serve to vent fluid in and out of the container efficiently.

Although the present invention has been described with reference to preferred embodiments, workers skilled in the art will recognize that changes may be made in form and detail without departing from the spirit and scope of the invention.

What is claimed is:

1. A processor for processing undeveloped photographic film discs, the processor comprising:
a rotatable spindle for carrying film discs;
a follower magnet connected to the spindle adjacent one end thereof;
conveyor means for conveying the spindle intermittently from a first to a second end of the processor along a generally horizontal conveyor path to each of a plurality of stations so that the spindle has an axial direction which is generally horizontal and perpendicular to the conveyor path;
a drive magnet rotatably mounted adjacent selected stations in spaced axial alignment with the follower magnet of the spindle when the spindle is positioned at one of the selected stations;
drive magnet rotation means for rotating the drive magnet to cause the follower magnet, spindle and film discs mounted thereon to be rotated due to magnetic coupling of the drive magnet and the follower magnet; and
rotation sensing means at each of the selected stations for sensing a failure of the follower magnet to be rotated by the drive magnet.

2. The processor of claim 1, and further comprising:
means responsive to the rotation sensing means for identifying any station at which the follower magnet and spindle connected thereto fail to rotate with their respective drive magnet.

3. The processor of claim 2, wherein the means for identifying comprises:
spindle sensing means for sensing the presence of the spindle adjacent the first end of the processor; and
means responsive to the spindle sensing means, the conveyor means, and the rotation sensing means for identifying any station at which a spindle is located and at which the rotation sensing means senses the failure of the follower magnet to be rotated by the drive magnet.

4. The processor of claim 3 wherein the conveying by the conveyor means is cyclical with each cycle of the conveyor means having a transport portion during which the spindle is transported from one station to another station and a processing portion during which the spindle is positioned at one of the stations for processing, and wherein the means responsive to the spindle sensing means identifies the station ony if the rotation sensing means senses the failure of the follower magnet to be rotated after a predetermined time interval following commencement of the processing portion of each cycle.

5. The processor of claim 3 wherein the conveying by the conveyor means is cyclical with each cycle of the conveyor means having a transport portion during which the spindle is transported from one station to another station and a processing portion during which the spindle is positioned at one of the stations for processing, and wherein the means responsive to the spindle sensing means is not actuated with regard to the rotation sensing means during the transport portion of each cycle.

6. The processor of claim 1 wherein a selected magnetic flux exists between the drive and follower magnets when the spindle is positioned at the station, and wherein the rotation sensing means comprises:

a magnetic reed switch positioned at each station to sense the presence of the selected magnetic flux between the drive and follower magnets.

7. A processor for processing undeveloped photographic film discs, the processor comprising:

a rotatable spindle for carrying film discs;

a follower magnet connected to the spindle adjacent one end thereof;

conveyor means for conveying the spindle intermittently from a first end to a second end of the processor along a generally horizontal conveyor path to each of a plurality of stations so that the spindle has an axial direction which is generally horizontal and perpendicular to the conveyor path, the intermittent conveying of the spindle by the conveyor means being cyclical with each cycle of the conveyor means having a transport portion during which the spindle is conveyed from one station to another station and a processing portion during which the spindle is positioned at one of the stations for processing;

a drive magnet rotatably mounted adjacent each station in spaced axial alignment with the follower magnet of the spindle when the spindle is positioned at the station;

drive magnet rotation means for rotating the drive magnet to cause the follower magnet, spindle and film discs mounted thereon to be rotated due to magnet coupling of the drive magnet and the follower magnet; and rotation sensing means at each station for sensing a failure of the follower magnet to be rotated by the drive magnet and providing a signal indicating the failure if the failure occurs after a predetermined time interval following commencement of the processing portion of each cycle.

8. The processor of claim 7, and further comprising:

means responsive to the rotation sensing means for identifying any station at which the follower magnet and spindle connected thereto fail to rotate with their respective drive magnet.

9. The processor of claim 8, wherein the means for identifying comprises:

spindle sensing means for sensing the presence of the spindle adjacent the first end of the processor; and means responsive to the spindle sensing means, the conveyor means, and the rotation sensing means for identifying any station at which a spindle is located and at which the rotation sensing means senses the failure of the follower magnet to be rotated by the drive magnet.

10. A processor for processing undeveloped photographic film discs, the processor comprising:

a rotatable spindle for carrying film discs;

conveyor means for conveying the spindle intermittently from a first end to a second end of the processor along a generally horizontal conveyor path to each of a plurality of stations so that the spindle has an axial direction which is generally horizontal and perpendicular to the conveyor path, the intermittent conveying of the spindle by the conveyor means being cyclical with each cycle of the conveyor means having a transport portion during which the spindle is conveyed from one station to another station and a processing portion during which the spindle is positioned at one of the stations for processing;

drive means for causing the spindle and film discs mounted thereon to be rotated when the spindle is positioned at each station during the processing portion;

rotation sensing means at each station for sensing a failure of the spindle to be rotated by the drive means;

spindle sensing means for sensing the presence of the spindle adjacent the first end of the processor; and means responsive to the spindle sensing means, the coveyor means, and the rotation sensing means for identifying any station at which a spindle is located and at which the rotation sensing means senses the failure of the spindle to be rotated by the drive means.

11. The processor of claim 10 wherein the means responsive to the spindle sensing means identifies the station only if the rotation sensing means senses the failure of the spindle to be rotated after a predetermined time interval following commencement of the processing portion of each cycle.

12. The processor of claim 10 wherein the spindle includes a follower magnet connected thereto adjacent one end thereof, and wherein the drive means comprises:

a drive magnet rotatably mounted adjacent each station in spaced axial alignment with the follower magnetic of the spindle when the spindle is positioned at the station; and drive magnet rotation means for rotating the drive magnet to cause the follower magnet, spindle and film discs mounted thereon to be rotated due to magnetic coupling of the drive magnet and the follower magnet.

* * * * *